United States Patent [19]

Matsunami et al.

[11] Patent Number: 5,137,958
[45] Date of Patent: Aug. 11, 1992

[54] THERMOPLASTIC RESIN COMPOSITION CONTAINING FIBROUS MAGNESIUM OXYSULFATE AND BORIC ACID

[75] Inventors: Tadashi Matsunami; Yukio Tasaka, both of Yamaguchi; Kazuo Tsuchiya; Kouji Matsumoto, both of Osaka, all of Japan

[73] Assignee: Ube Industries, Ltd., Yamaguchi, Japan

[21] Appl. No.: 681,187

[22] Filed: Apr. 5, 1991

[30] Foreign Application Priority Data

Apr. 6, 1990 [JP] Japan .................................. 2-90142

[51] Int. Cl.$^5$ .......................... C08J 5/10; C08K 3/38; C08L 85/04

[52] U.S. Cl. ................................... 524/405; 524/423; 524/436

[58] Field of Search ....................... 524/405, 423, 436

[56] References Cited

U.S. PATENT DOCUMENTS 4,990,554  2/1991  Nomura et al. ..................... 524/436

Primary Examiner—Paul R. Michl
Assistant Examiner—U. K. Rajguru
Attorney, Agent, or Firm—McAulay Fisher Nissen Goldberg & Kiel

[57] ABSTRACT

A thermoplastic resin composition of a thermoplastic resin and a fibrous magnesium oxysulfate is made to be resistant to coloring by incorporation of a boric acid or boric acid anhydride.

4 Claims, No Drawings

THERMOPLASTIC RESIN COMPOSITION CONTAINING FIBROUS MAGNESIUM OXYSULFATE AND BORIC ACID

BACKGROUND OF THE INVENTION

1. Field of the invention

The present invention relates to a thermoplastic resin composition containing fibrous magnesium oxysulfate which is made to be resistant to coloring. In more detail, the present invention relates to a thermoplastic resin composition employable for the production of a thermoplastic resin molding article which is excellent in various properties such as rigidity, mechanical strength, heat resistance and resistance to coloring.

2. Description of prior art

It is well known to incorporate inorganic materials into thermoplastic resins for the purpose of improving various properties of the thermoplastic resins, such as rigidity, mechanical strength, heat resistance, molding shrinkage and dimensional stability. Examples of the inorganic materials employable for that purpose include particulate substances such as calcium carbonate, barium sulfate and magnesium hydroxide; plate-shaped or flake-shaped substances such as talc and mica; and fibrous substances such as glass fiber and asbestos.

The particulate substances, among these inorganic materials, hardly give high reinforcing effect to the thermoplastic resins, so that the thermoplastic resin molds obtained by adding the particulate substances to the resins cannot be always employed for industrial materials requiring high quality. On the other hand, the plate-shaped or flake-shaped substances and the fibrous substances show high reinforcing effect in one- or two-dimensional directions, so that these substances are widely used as reinforcements for thermoplastic resins of high quality. However, since the above-mentioned reinforcements showing high reinforcing effect also have various drawbacks, they are sometimes restricted in their use depending on the purpose. For example, products obtained by molding the thermoplastic resins containing the plate-shaped or flake-shaped substances, are apt to have flow marks occurring in the molding procedure and generally show low rigidity as compared with molded products obtained from the thermoplastic resins containing fibrous substances such as fiber glass. On the other hand, the thermoplastic resins containing fibrous substances are molded to show poor elongation and to likely have silver streaks on the surfaces of the molded products. Further, the surfaces of the molded products mostly exhibit low glossiness. Particularly in the case of using a glass fiber, the resulting molded product shows low resistance to falling ball impact. Accordingly, in the use of the above-mentioned conventional reinforcements, it is necessary to make an appropriate selection according to the purpose.

The above-mentioned various drawbacks can be removed to a certain extent by appropriately selecting or modifying base materials, subjecting inorganic materials to be used as the reinforcements to surface treatment, adding other appropriate additives, adjusting molding and processing conditions, etc., but satisfactory removal of the drawback can be hardly obtained.

As a thermoplastic resin composition which is improved in various drawbacks found in conventional thermoplastic resin compositions containing the above-mentioned reinforcements, a thermoplastic resin composition having a fibrous (needle-like) magnesium oxysulfate has been proposed.

A polypropylene composition using the fibrous (needle-like) magnesium oxysulfate and crystalline polypropylene as a thermoplastic resin, which is improved in the above various properties, for example, is disclosed in Japanese Patent Provisional Publication No. 62(1987)-9260, and a composition of polyvinyl chloride containing a fibrous (needle-like) magnesium oxysulfate which is enhanced in rigidity is disclosed in Japanese Patent Provisional Publication No. 59(1984)-96153.

However, in the case of kneading fibrous or needle-like magnesium oxysulfate into a melted thermoplastic resin, the above resin compositions are apt to be colored.

A method improved in the above problem is proposed in Japanese Patent Provisional Publication No. 3(1991)-21646 in which the method of treating (coating) a fibrous (needle-like) magnesium oxysulfate employed for a thermoplastic resin component with an anionic surface-active agent is described. However, the kneading of the magnesuim oxysulfate in a melted thermoplastic resin removes a portion of the coating from the coated magnesium oxysulfate. Therefore, the surface active agent cannot bring about a sufficiently excellent effect of preventing the composition from coloring.

SUMMARY OF THE INVENTION

The object of the present invention is to provide a thermoplastic resin composition containing a fibrous (needle-like) magnesium oxysulfate which is resistant to coloring.

The present inventors have discovered that a thermoplastic resin composition suffering little coloring can be obtained by adding a boric acid or its anhydride into a thermoplastic resin and a fibrous or needle-like magnesium oxysulfate.

There is provided by the invention a thermoplastic resin composition comprising a composition of a thermoplastic resin, a fibrous magnesium oxysulfate in the range of 2 to 100 parts by weight per 100 parts by weight of the thermoplastic resin and a boric acid or its anhydride in the range of 0.05 to 10 parts by weight per 100 parts by weight of the fibrous magnesium oxysulfate.

In the present invention, the coloring occurring in the kneading a melted thermoplastic resin composition containing fibrous magnesium oxysulfate is decreased compared with the coloring observed in the prior art.

DETAILED DESCRIPTION OF THE INVENTION

The fibrous (needle-like) magnesium oxysulfate is not neutral but has a weak basicity. Such basicity is supposed to promote oxidation of the thermoplastic resin or various additives added to the resin to cause coloring of the resin component. It is presumed that boric acid or its anhydride neutralizes the basicity of the fibrous (needle-like) magnesium oxysulfate to prevent the resin component from the coloring.

There is no specific limitation with respect to the thermoplastic resins employable in the present invention. Examples of the thermoplastic resins employable in the invention include crystalline polypropylene, polyethylene, polyvinyl chloride, ABS resin (acrylonitrile butadiene stylene resin), polyamide (e.g., nylon 6, nylon 12) and polyacetal.

Examples of the crystalline polypropylene include a homopolymer of propylene and any crystalline propylene copolymers such as a copolymer of propylene and other α-olefin.

The crystalline polypropylene may be a denatured crystalline polypropylene. Examples of the denatured crystalline polypropylenes include such a polymer as obtained by reacting polypropylene with a polymerizable vinyl monomer such as maleic anhydride, acrylic acid and glycidyl methacrylate; or an organic silane type compound having an unsaturated group such as vinylsilane and 65 -methacryloxypropyltrimethoxysilane in the presence of an organic peroxide under heating. Further, the crystalline polypropylene may be admixed with a small amount of a known polymer such as polyethylene, polybutadiene or ethylenepropylene rubber.

Preferable examples of polyethylene include HDPE (high density polyethylene), LDPE (low density polyethylene) and LLDPE (linear low density polyethylene).

Preferable examples of polyvinyl chlorides include a homopolymer of vinyl chloride and a copolymer containing vinyl chloride moiety of not less than 50 weight %.

Examples of polystyrene include amorphous polymers such as a homopolymer of styrene, a graftpolymer obtained by grafting styrene to polybutadiene or SBR (styrene-butadiene rubber), and a polymer blend of polystyrene and polybutadiene or SBR.

The fibrous magnesium oxysulfate employable in the invention can be prepared by the method described in Japanese Patent Provisional Publication No. 1(1989) 126218. In more detail, the magnesium oxysulfate can be preferably prepared by dispersing magnesium hydroxide or magnesium oxide having BET specific surface area of not more than 20 m$^2$/g into an aqueous solution of magnesium sulfate so as to have a concentration of not high than 25% by weight and then allowing the resulting dispersion to react hydrothermally at 100–300° C. The X-ray diffraction spectrum of powder of the resultant synthetic substance (fibrous magnesium oxysulfate) agrees very closely with that of ASTM No.7-415. Accordingly, the resultant substance can be represented by the formula of MgSO$_4$5Mg(OH)$_2$.3H$_2$O.

The fibrous magnesium oxysulfate has a true specific gravity of 2.0 to 2.5, a length (fiber length) of a few μm to 1000 μm, a diameter (fiber diameter) of 0.1 to 10 μm, and an apparent specific gravity of 0.05 to 0.3. Thus, the magnesium sulfate is an extremely bulky substance in the form of a fiber or needle.

The fibrous magnesium oxysulfate employable in the invention may be treated with any of various surface treating agents unless the object of the invention is not disturbed. Preferable examples of the treating agents include a silane coupling agent, a titanate coupling agent and an anionic surface active agent. The magnesium oxysulfate preferably is to have been treated with the above treating agents.

The fibrous magnesium oxysulfate is used in an amount in the range of 2 to 100 parts by weight, generally 2 to 50 parts by weight and preferably 10 to 30 parts by weight, based on 100 parts by weight of the thermoplastic resin of the composition.

In the invention, boric acid or its anhydride is employed as an additive for preventing coloring. Their examples include orthoboric acid, metaboric acid, pyroboric acid and boric acid anhydride. In the thermoplastic resin composition of the invention, pyroboric acid or boric acid anhydride is preferably employed. Orthoboric acid and metaboric acid undergo dehydration when these are heated. If the dehydration occurs in a molding process, silver streak generates on the molding product. Accordingly, it is necessary to adjust the conditions of molding such as molding temperature, molding time and amount of orthoboric acid or metaboric acid so as to prevent generation of silver streak.

The boric acid or its anhydride is employed in the amount in the range of 0.05 to 10 parts by weight, generally 0.05 to 5.0 parts by weight and preferably 0.2 to 2.0 parts by weight, based on 100 parts by weight of the fibrous magnesium oxysulfate. In the case that the amount of less than 0.05 parts by weight, the effect of preventing the thermoplastic resin composition from coloring can not be sufficiently obtained. Use of a boric acid or its anhydride of more than 10 parts by weight does not bring about increased excellent effect than that in use of 10 parts by weight, so that such excessive use is not practical.

The thermoplastic resin composition of the invention may contain any of various additives generally employed for a thermoplastic resin, unless the object of the invention is not disturbed. Examples of the additives include antioxidants, light stabilizers, lubricants, antistatic agents, heavy metal inactivation agents, wetting agents, flame retarders, pigments, anti-blocking agents, radical generators and dispersing agents such as metallic soaps and a neutralizing agent. Further, the thermoplastic resin composition of the invention may contain inorganic fillers generally employed for a known thermoplastic resin, for example, talc, mica, wollastonite, zeolite, asbestos, calcium carbonate, aluminum hydroxide, magnesium hydroxide and glass fibers.

The thermoplastic resin composition of the invention is generally prepared by mixing a predetermined amount of fibrous or needle-like magnesium sulfate and boric acid or its anhydride with a thermoplastic resin using the known mixing machines such as a ribbon blender and a super mixer, and then kneading under melting using a known kneading machine such as a single- or twin-screw extruder, a Brabender Plasti-Corder or a mixing roll, to pelletize. The resultant thermoplastic resin composition of the invention can be molded or processed by any of known various molding methods such as injection molding, extrusion molding and pressing, whereby the molded product can be obtained.

Examples of the present invention and comparison examples are given below.

EXAMPLE 1

100 parts by weight of pellets of crystalline propylene-ethylene copolymer (MFR: 3.0 g/10 min., ethylene content: 7 wt. %, containing a stabilizer, trade name: J703H, available from Ube Industries, Ltd.), 20 parts by weight of fibrous magnesium oxysulfate (fiber length: 5–80 μm, fiber diameter: 0.1–4 μm, trade name: MOS-HIGE, available from Ube Industries, Ltd.) and 0.2 parts by weight of boric acid anhydride were well mixed with each other using a ribbon blender. The resulting mixture then kneaded under melting using a Brabender Plasti-Corder for 5 minutes at 220° C. and 60 r.p.m. The resulting composition was cooled and subjected to molding in a pressure press under the conditions of a temperature of 220° C. and a pressure of 100 kg/cm$^2$, to prepare a test strip.

The degree of coloring of the above test strip was measured using a photoelectric colorimeter (available from Nippon Denshoku Co., Ltd., Japan).

The results are set forth in Table 1.

A color difference $\Delta E_N$ is calculated by introducing lightness index and chromatics indices obtained from the value measured on the photoelectric colorimeter, which is described in a method of indicating color difference (JIS-Z8730-1980), into Hunter's color difference formula shown below. The reference color difference value is a value of the reference example 1 described below.

Color difference indicated by Hunter's color difference formula $$\Delta E_N = [(\Delta L)^2 + (\Delta a)hu\ 2 + (\Delta b)^2]^{\frac{1}{2}}$$

In the above formula, $\Delta E_N$ means Color difference indicated by Hunter's color difference formula. The formula shows that the less the degree of coloring is, the smaller the value of $\Delta E_N$ becomes.

$\Delta L$ is difference of lightness indices (L) of two surface colors, and $\Delta a$ and $\Delta b$ respectively are difference of chromaticness indices (a) of two surface colors and difference of chromatics indices (b) of two surface colors.

L (Lightness index) means one coordinate in a three dimension space having almost perceptively homogeneous degree and an index indicating lightness. The larger the lightness index becomes, the brighter it is.

a, b (Chromaticness indices) mean two coordinates in a three dimension space having almost perceptively homogeneous degree and indices indicating chromatics. a indicates tendency of red (+ side) or green (− side). b indicates yellow (+ side) or blue (− side).

EXAMPLE 2

The procedures of Example 1 were repeated except for using orthoboric acid instead of boric acid anhydride, to prepare a test strip. The degree of coloring of the test strip was measured by the above method.

The result of the above measurement is set forth in Table 1.

COMPARISON EXAMPLE 1

The procedures of Example 1 were repeated except for not using the boric acid, to prepare a test strip. The degree of coloring of the test strip was measured by the above method.

The result of the above measurement is set forth in Table 1.

COMPARISON EXAMPLE 2

The procedures of Example 1 were repeated except for not using the boric acid and using magnesium oxysulfate treated its surface with sodium stearate as fibrous magnesium oxysulfate, to prepare a test strip. The degree of coloring of the test strip was measured by the above method.

The result of the above measurement is set forth in Table 1.

REFERENCE EXAMPLE 1

The procedures of Example 1 were repeated except for not using the boric acid and the fibrous magnesium oxysulfate to prepare a test strip. The degree of coloring of the test strip was measured by the above method.

The result of the above measurement is set forth in Table 1.

TABLE 1

| | Ref. ex. 1 | Ex. 1 | Ex. 2 | Com. Ex. 1 | Com. Ex. 2 |
|---|---|---|---|---|---|
| Magnesium oxysulfate | | | | | |
| untreated | — | 20 | 20 | 20 | — |
| treated | — | — | — | — | 20 |
| Boric acid | | | | | |
| Orthoboric acid | — | — | 0.2 | — | — |
| Boric acid anhydride | — | 0.2 | — | — | — |
| Boric acid/Magnesium oxysulfate | — | 1/100 | 1/100 | — | — |
| Degree of color development | | | | | |
| L value | 63.21 | 65.11 | 65.27 | 53.80 | 58.21 |
| a value | −1.72 | −1.75 | −1.63 | −0.52 | −0.83 |
| b value | 3.43 | 4.83 | 3.86 | 15.12 | 9.71 |
| Color difference | — | 2.36 | 2.11 | 15.1 | 8.08 |

We claim:

1. A thermoplastic resin composition comprising a composition of a thermoplastic resin, a fibrous magnesium oxysulfate in the range of 2 to 100 parts by weight per 100 parts by weight of the thermoplastic resin and a boric acid or its anhydride in the range of 0.05 to 10 parts by weight per 100 parts by weight of the fibrous magnesium oxysulfate.

2. The thermoplastic resin composition as claimed in claim 1, wherein the amount of the fibrous magnesium oxysulfate is in the range of 2 to 50 parts by weight per 100 parts by weight of the thermoplastic resin.

3. The thermoplastic resin composition as claimed in claim 1, wherein the amount of the boric acid or its anhydride is in the range of 0.05 to 5.0 parts by weight per 100 parts by weight of the fibrous or needle-like magnesium oxysulfate.

4. The thermoplastic resin composition as claimed in claim 1, wherein the boric acid or its anhydride is pyroboric acid, orthoboric acid or boric acid anhydride.

* * * * *